UNITED STATES PATENT OFFICE.

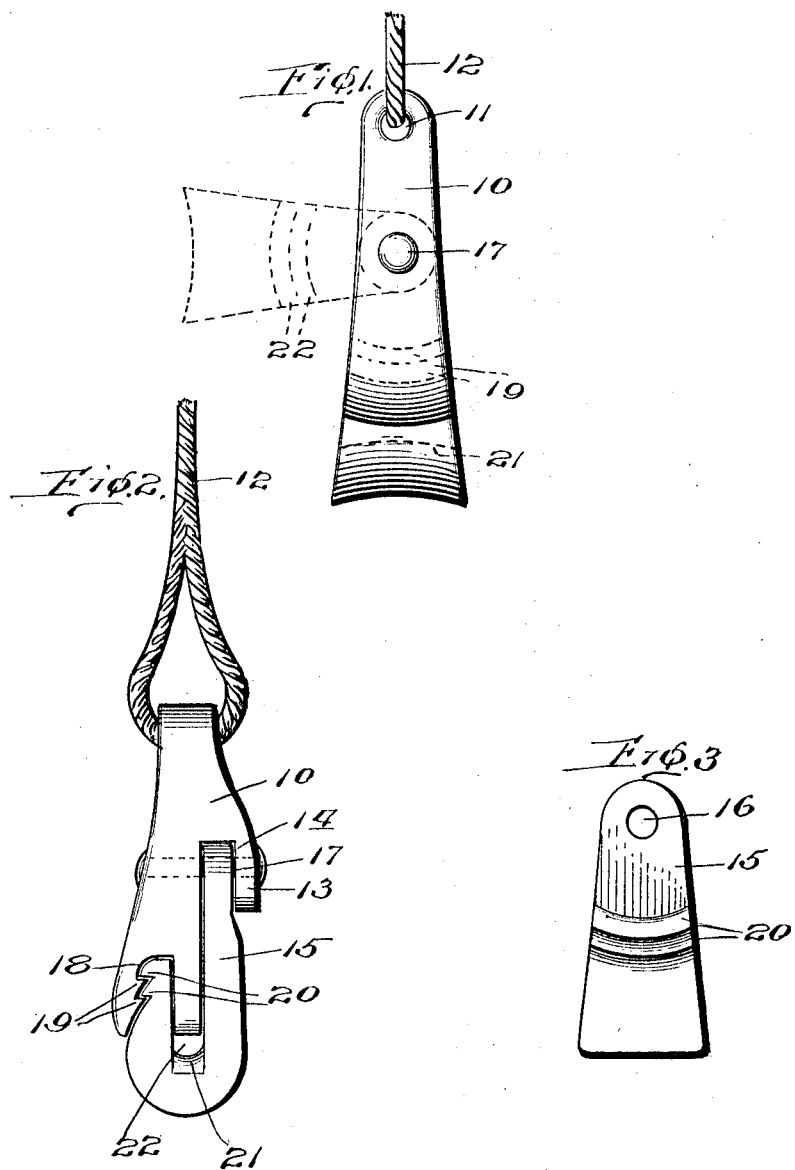

ISAAC OLLI, OF CRESTMONT, NORTH CAROLINA.

HOOK.

1,055,214.  Specification of Letters Patent.  Patented Mar. 4, 1913.

Application filed June 7, 1912. Serial No. 702,329.

*To all whom it may concern:*

Be it known that I, ISAAC OLLI, a subject of the Czar of Russia, residing at Crestmont, in the county of Haywood and State of North Carolina, have invented certain new and useful Improvements in Hooks; and I do hereby declare the following to be a full, clear, and exact description of the invention, such as will enable others skilled in the art to which it appertains to make and use the same.

This invention relates to improvements in hooks, and is more particularly related to hooks for draft purposes.

Draft hooks, as commonly employed, are open to the objection that when the cables or lines with which the same are connected become slackened, the cables or lines are shed by the hooks and thereby become free from engagement therewith. Particularly this is true in logging operations, so that it is necessary to reëngage the hooks with the cables or lines with an attendant loss of time. Furthermore, when provision is made for locking the ordinary hooks from displacement of the cables or lines connected therewith, the locking means are at the exterior of the hooks, and this renders the same objectionable in use since the locking means are susceptible of displacement in the use of the hooks, and are, therefore, unreliable in being maintained in locked position.

It is the object of the present invention to provide a hook which shall be free from the objections above noted, which is exceedingly simple in construction and inexpensive to manufacture, and which, when a cable or line is engaged therewith, will hold the cable or line within the hook, and thus avoid shedding when the cable or line becomes slackened.

With this general object in view, and others which will appear as the nature of the improvements is better understood, the invention consists substantially in the novel construction, combination and arrangement of parts, hereinafter fully described, illustrated in the accompanying drawings, and pointed out in the appended claim.

In the drawings: Figure 1 is a side elevation of a hook constructed in accordance with the present invention. Fig. 2 is a similar view, viewing the hook at right angles to the view point of Fig. 1. Fig. 3 is a detail elevation of the hook member removed.

Referring in detail to the accompanying drawings, the numeral 10 designates the shank member of the herein described invention. The extremity of this member is provided with an eye 11 for receiving the end of a cable 12, although, if desired, the shank member 10 may be provided with other forms of eyes as are common in hook structures, so that the cable 12 may have relative turning movement with respect to the shank member 10, and thereby prevent twisting of the cable.

At one side of the shank member 10, and at a point which is substantially mid-way between the ends thereof is formed a longitudinally extending perforated ear 13, which ear is spaced from the outer end of the shank member 10 and thereby provides a notch 14 for receiving a hook member 15. The hook member 15 has an eye 16 and said eye receives a fastening rivet or bolt 17, the latter being seated in the perforated ear 13 of the shank member 10 and passing transversely of said shank member, as clearly illustrated in Fig. 2. The rivet or bolt 17, therefore, forms a hinge upon which the hook member 15 swings.

At the extremity of the shank member 10 which is opposite to that end in which the eye 11 is formed is provided a locking notch 18, and one face of said notch has a plurality of teeth 19 formed therein. These teeth are concentrically arranged with the pivot 17, and the free end of the hook member 15 is likewise provided with a plurality of teeth 20 which interlock with the teeth 19. The teeth 20 are also concentric with the pivotal point 17. By reason of the teeth 19 and 20 interengaging longitudinal strain exerted on the hook member 15 will hold these teeth in frictional engagement with each other, but by reason of their concentricity with the pivotal point 17, it will be obvious that the hook member 15 may be readily swung upon said pivot to open the hook for either receiving or discharging the cable 12 as such is desired.

The inner face of the crotch of the hook member 15 is made convex, as at 21, and this convexity, in coöperation with the outer extremity of the shank member 10, forms a passage 22 designed to receive the cable or the element with which the hook member 15 may be engaged.

In the use of the herein described hook the hook member 15 is swung to the position illustrated by dotted lines in Fig. 1 or approximately to such position, and this permits the cable, or other element with which the hook is to be engaged, to be introduced to the crotch of the hook member 15. By thus bringing the hook member 15 and the shank member 10 into longitudinal alinement, as illustrated in Figs. 1 and 2, the teeth 20 of the hook member are interlocked with the teeth 19 of the shank member and the cable is thus confined within the crotch of the hook member 15. If, therefore, there should be any slacking of the cable the latter is still retained within the space 22, its disengagement being possible only after the members 10 and 15 have been displaced from their alined position so that engagement of the hook with the cable is always assured.

When the hook is employed for logging operations this is of decided advantage, as previously pointed out, and saves the time which is necessarily consumed by repeatedly engaging the hook with the cable. Longitudinal strain exerted upon the hook member 15 causes the teeth 19 and 20 to frictionally engage, so that this frictional engagement opposes any swinging of the member 15 in relation to the member 10 and vice versa.

The present invention is susceptible of a variety of uses, being capable of employment for logging operations; it is also useful upon trace chains or it can be used in connection with guy lines, ropes, and other conditions which will readily suggest themselves.

When used for logging purposes, as by drawing logs from the woods to the log yard, the end of the cable is wrapped about the log, and the hook member 15 engaged with the cable beyond the eye 11, thus forming a loop in which the log is located, so that the pull exerted on the cable causes the hook to move toward the log, and thereby holds the log firmly within the loop.

I claim—

In a hook, a shank member provided with a pintle and a notch, arcuate ribs within the notch, said ribs extending into the notch and having the pintle as a center, a hook member pivoted upon the pintle and having a return bend, arcuate ribs formed upon the return bend of the hook and having the pintle as a center, the return bend of the hook adapted to swing into the notch with the ribs of the hook engaging the ribs within the notch.

In testimony whereof I affix my signature in presence of two witnesses.

ISAAC OLLI.

Witnesses:
C. G. Mack,
Mrs. C. G. Mack.

Copies of this patent may be obtained for five cents each, by addressing the "Commissioner of Patents, Washington, D. C."